US012608326B2

(12) United States Patent
Addison et al.

(10) Patent No.: US 12,608,326 B2
(45) Date of Patent: Apr. 21, 2026

(54) DMA TECHNIQUES FOR READING 3D DATA

(71) Applicant: Infineon Technologies AG, Neubiberg (DE)

(72) Inventors: David Addison, Bristol (GB); Dyson Wilkes, Marlborough (GB); Markus Bichl, Feldkirchen-Westerham (DE)

(73) Assignee: Infineon Technologies AG, Neubiberg (DE)

( * ) Notice: Subject to any disclaimer, the term of this patent is extended or adjusted under 35 U.S.C. 154(b) by 307 days.

(21) Appl. No.: 18/183,317

(22) Filed: Mar. 14, 2023

(65) Prior Publication Data

US 2024/0311320 A1      Sep. 19, 2024

(51) Int. Cl.
| | |
|---|---|
| *G06F 13/28* | (2006.01) |
| *G01S 7/285* | (2006.01) |
| *G01S 7/35* | (2006.01) |
| *G01S 13/58* | (2006.01) |

(52) U.S. Cl.
CPC ............. *G06F 13/28* (2013.01); *G01S 13/58* (2013.01); *G01S 7/285* (2013.01); *G01S 7/356* (2021.05); *G06F 2213/28* (2013.01)

(58) Field of Classification Search
CPC ...... G06F 13/28; G06F 2213/28; G01S 13/58; G01S 7/356; G01S 7/285
See application file for complete search history.

(56) References Cited

U.S. PATENT DOCUMENTS

| | | | | |
|---|---|---|---|---|
| 6,526,430 B1* | 2/2003 | Hung | .................... | H04N 19/433 |
| | | | | 375/E7.101 |
| 2015/0346321 A1* | 12/2015 | Jansen | .................... | H03M 7/30 |
| | | | | 342/107 |
| 2020/0119736 A1* | 4/2020 | Weber | .............. | H03K 19/17756 |
| 2023/0138972 A1* | 5/2023 | Nair | ........................ | G01S 7/354 |
| | | | | 342/93 |

* cited by examiner

*Primary Examiner* — Jack W Keith
*Assistant Examiner* — Clayton Paul Ridder
(74) *Attorney, Agent, or Firm* — Eschweiler & Potashnik, LLC

(57) ABSTRACT

A radar system includes a radio frequency (RF) receiver configured to receive radar data at a plurality of receive antennae. A fast Fourier transform (FFT) circuit is coupled to the RF receiver. The FFT circuit is configured to perform a FFT on the radar data to provide a stream of complex values. The stream of complex values includes a plurality of Range-Doppler coordinate pairs that pertain to the plurality of receive antennae. A memory is coupled to the FFT circuit. The memory is configured to store three-dimensional (3D) radar data. A Direct Memory Access circuit (DMA) is coupled to the memory.

13 Claims, 7 Drawing Sheets

300

300

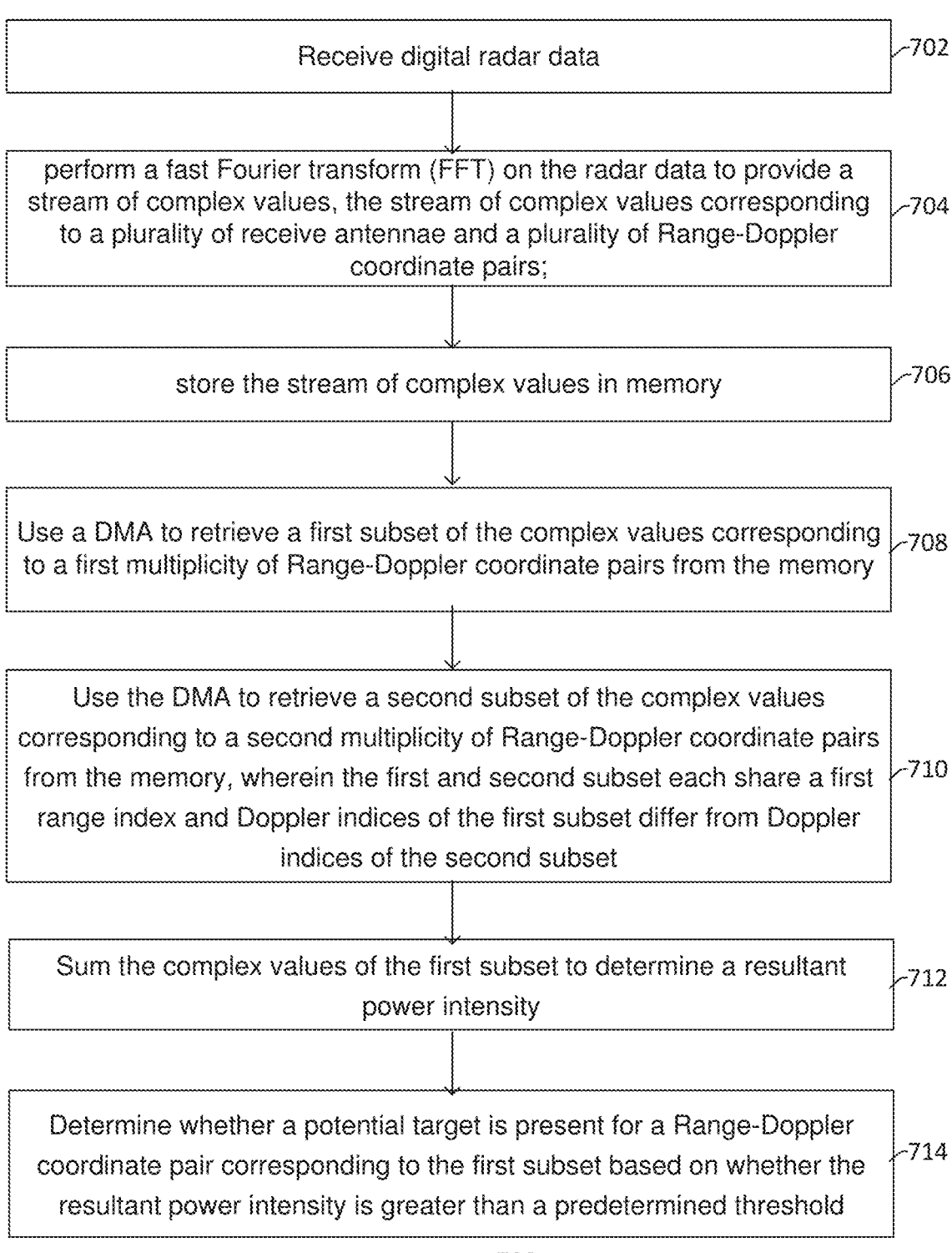

Receive digital radar data ⟋702 perform a fast Fourier transform (FFT) on the radar data to provide a stream of complex values, the stream of complex values corresponding to a plurality of receive antennae and a plurality of Range-Doppler coordinate pairs; ⟋704 store the stream of complex values in memory ⟋706

Use a DMA to retrieve a first subset of the complex values corresponding to a first multiplicity of Range-Doppler coordinate pairs from the memory ⟋708

Use the DMA to retrieve a second subset of the complex values corresponding to a second multiplicity of Range-Doppler coordinate pairs from the memory, wherein the first and second subset each share a first range index and Doppler indices of the first subset differ from Doppler indices of the second subset ⟋710

Sum the complex values of the first subset to determine a resultant power intensity ⟋712

Determine whether a potential target is present for a Range-Doppler coordinate pair corresponding to the first subset based on whether the resultant power intensity is greater than a predetermined threshold ⟋714

DMA TECHNIQUES FOR READING 3D DATA

FIELD

The present disclosure relates in general to electronic systems such as radar systems, and more particularly, to radar systems that utilize three-dimensional radar data.

BACKGROUND

Radar (RAdio Detection And Ranging) systems use radio waves to determine the location and/or velocity of targets in a field. Historically, radar has been used to detect aircraft, ships, spacecraft, guided missiles, and terrain, among others. In more recent times, radar has also been used to study and/or predict weather formations, and has been used in collision-detection and/or collision-avoidance in motor vehicles. A radar system includes a transmitter to produce electromagnetic waves in the radio or microwave domain, a receiver to receive those waves after they bounce back from one or more targets in a field, and a processor to determine properties of the targets. The electromagnetic waves from the transmitter can be pulsed or continuous, and reflect off the target and return to the receiver, giving information about the target's location and/or velocity relative to the radar system.

BRIEF DESCRIPTION OF THE DRAWINGS

FIG. 7 illustrates a method in flow-chart format according to some aspects of the present disclosure.

DETAILED DESCRIPTION

Figures 1, 2:
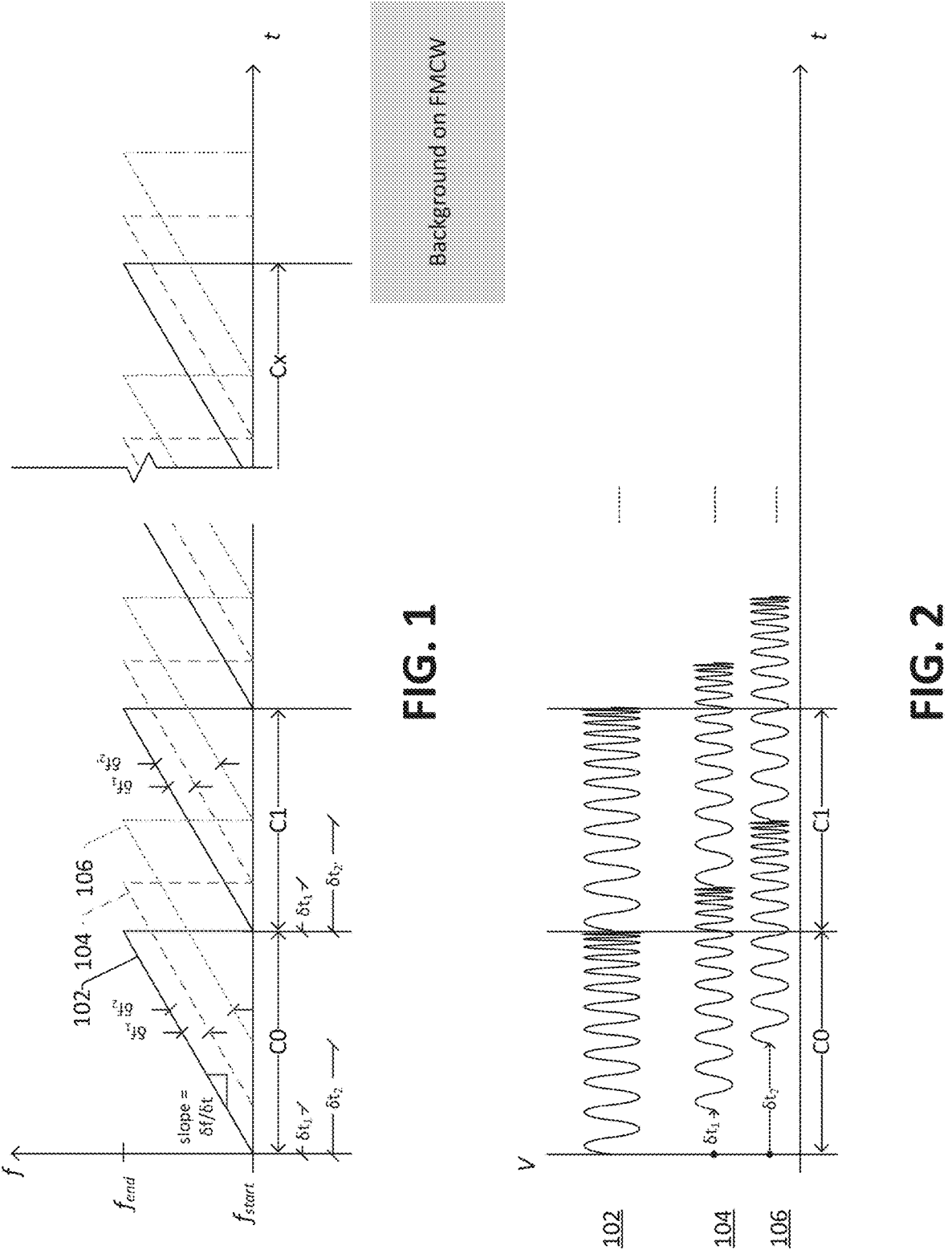
FIG. 1 illustrates a frequency-time plot for a transmitted waveform and received waveforms used in a frequency modulated continuous wave (FMCW) radar system.
FIG. 2 illustrates a voltage-time plot for the transmitted waveform and received waveforms of FIG. 1.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware.

Radar systems transmit electromagnetic waves in the form of discrete pulses or continuous waves, and then listen for received pulses (or echoes) to determine the location and/or velocities of targets in a field. For example, FIG. 1 shows an example of a simple transmitted waveform 102 transmitted by a frequency modulated continuous wave (FMCW) radar system, and two received waveforms (or echoes) 104, 106 that reflect back from various targets in the field. It will be appreciated that these waveforms are merely non-limiting examples, and actual waveforms can take any number of forms.

The transmitted waveform 102 includes a series of ramps or "chirps", which are transmitted so as to be repeated at regularly spaced time windows C0, C1, C2, . . . , Cx. FIG. 1 shows the instantaneous frequency of the chirps versus time, while FIG. 2 shows the corresponding modulated voltage signals of the chirps as they are transmitted in the corresponding time windows C0, C1, . . . . Each ramp starts at the beginning of a given time window at a start frequency $F_{start}$ and ramps up or down to an end frequency Fend at the end of the given time window. Ideally, each ramp has a constant slope during that time window, which provides a link between time delay, beat frequency, and range for various targets in the FMCW radar system. In actual implementations, the slope may not be perfectly constant and may vary slightly in time.

The received waveforms 104, 106 or "echoes" are in response to the transmitted waveform 102. The received waveforms 104, 106 are time delayed copies of the transmitted waveform 102 and also carry a Doppler component due to the relative velocity of the target from which they reflect. Thus, for example, in FIG. 1 and FIG. 2, the first received waveform 104 is reflected from a first target at range 1 and is delayed relative to the transmitted pulse by a first delay, δt1 for the first time window C0. Similarly, the second received waveform 106 is reflected from a second target at range 2 and is delayed relative to the transmitted waveform 102 by a second delay, δt2 for the first time window C0. Because these time delays δt1, δt2 represent the roundtrip delay from the transceiver to the first and second targets in the field, these time delays form the basis of determining the first and second ranges to the first and second targets, respectively.

Further, for later time windows, if the targets are moving, the delay and/or frequency difference at a given time between the transmitted waveform 102 and the received waveforms (e.g., 104, 106) may change slightly, and this can evidence the velocity of various targets. For instance, for the first and second time windows, consider the first target is a first range from the transceiver and corresponds to the first delay, δt1 (and equivalently a first frequency shift δf1). Because this first delay, δt1, is unchanged in the first and second time windows, it suggests that the first target is at the same range at both times (e.g., and has zero relative velocity), relative to the radar transceiver. However, the second target has a second delay δt2 for the first time window and has a slightly perturbed delay δt2' (which differs slightly from the second delay δt2) for the second time window. Therefore, this small change between δt2 and δt2' manifests itself as a Doppler shift for the second target, and suggests the second target is moving with some non-zero velocity relative to the radar transceiver. Note that, relative to the duration of a given time window, the lengths of the time delays δt1, δt2 are exaggerated in FIG. 1 and FIG. 2 for purposes of clarity of understanding.

Figure 3:
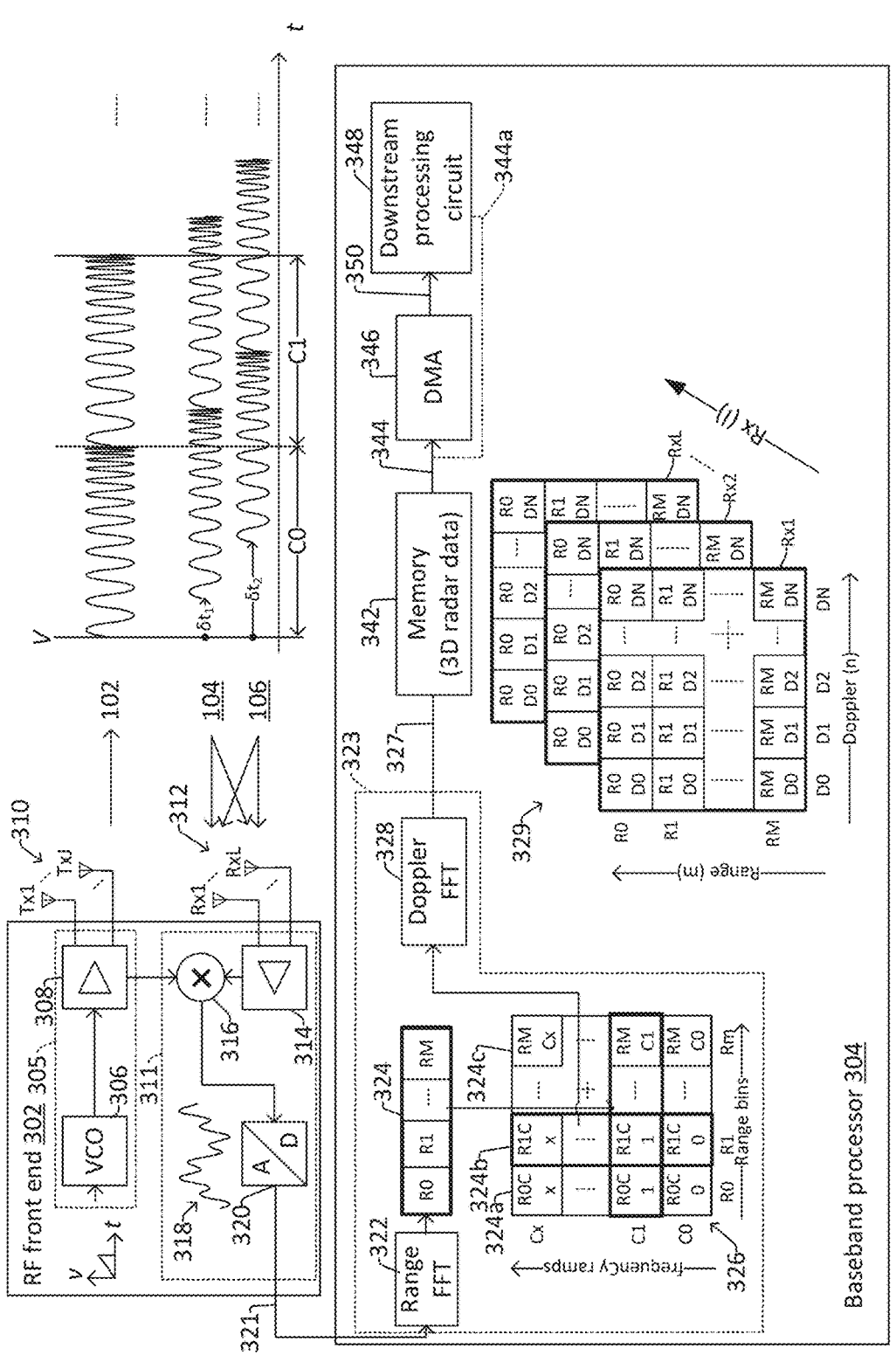
FIG. 3 illustrates a FMCW radar system that includes a Direct Memory Access (DMA) circuit to read 3 dimensional (3D) radar data in accordance with some aspects of the present disclosure.

FIG. 3 illustrates a FMCW radar transceiver 300 in accordance with some embodiments, and which can make use of FMCW waveforms such as described in FIGS. 1-2. The transceiver 300 includes a radio frequency (RF) front end 302 and a baseband processor 304 downstream of the RF front end 302. The illustrated RF front end 302 illustrates a transmission path 305 and a reception path 311, though multiple transmission paths and/or reception paths are typically present. The transmission path 305 is coupled to J transmission antennae 310 (J=any positive integer), and for each transmission antenna the transmission path can include a voltage controlled oscillator (VCO) 306, and a transmission amplifier 308. The reception path 311 is coupled to L reception antennae 312 (L=any positive integer), and for each reception antenna can include a reception amplifier 314, a mixer 316, and an analog-to-digital converter (ADC) 320. The transmission antenna 310 are typically spaced at equal distances from one another, as are the reception antennae 312.

During operation, the transmission path 305 generates a transmitted waveform 102 for example using the VCO 306. In the illustrated example, the transmitted waveform 102 has a frequency that ramps in time for x ramps transmitted in x time windows, respectively. The transmitted waveform is achieved by performing a frequency modulation of a carrier frequency, Fc, such that the instantaneous frequency of the transmitted waveform 102 varies from $f_{start}$ to $f_{end}$. The transmitter transmits the waveform 102 using the transmission amplifier 308 and transmission antennae 310.

The received waveforms or "echoes" (e.g., 104 and 106) are received by the reception antennae 312 and the reception amplifier 314. Because each target in the field generates a different echo, each reception antenna 312 sees a superposition of all received waveforms. The mixer 316 mixes the transmitted waveform 102 and the received waveforms 104, 106 and thereby multiplies these waveforms together to provide a mixed signal 318. This mixed signal 318 includes a beat frequency, which is a mixture of the frequencies of the received waveforms (e.g., $\delta f1$ and $\delta f2$). Thus, this beat frequency corresponds to time delays for the various targets, and wherein these time delays correspond to the ranges to the various targets, respectively. The beat frequency is much less than the carrier frequency, Fc; or the central frequency of the sweep. The beat frequency is then sampled by the ADC 320 to generate a digital radar signal 321.

In the baseband processor 304, a signal processing unit 323 includes a fast Fourier transform (FFT) circuit to perform a first FFT 322 and a second FFT 328. In some embodiments, the first FFT 322 and second FFT 328 correspond to separate FFT circuit instantiations arranged in series on an integrated circuit, and which collectively correspond to the FFT circuit. In other embodiments, however, first FFT 322 and second FFT 328 can be a single FFT circuit with surrounding circuitry to re-route data through the single FFT circuit multiple times to achieve the data processing illustrated in FIG. 3. In either case, the result is that the first FFT—or Range FFT 322—is initially performed on the digital radar signal 321. The Range FFT 322 separates the individual beat frequencies in the digital radar signal 321, which directly leads to a first FFT result 324 with a number of range bins, with each range bin corresponding to a different range of ranges/distances in which objects can be found. This FFT process is repeated over every ramp of x ramps (e.g., from ramp C0 . . . to ramp Cx), and the FFT results are stored in a first memory 326 for each of x ramps. When all the x ramps are complete, a block of data representing the full field range data is stored in the first memory 326. The results in each range bin (e.g., @R1 range bin 324b, which includes a range value for Range R1 for each of the x ramps) may look similar for the various frequency ramps in that range bin, but, since the individual ramps C0, C1, . . . . Cx are separated in time, the samples in a given range bin carry a subtle phase difference induced by the Doppler shift of the various objects (e.g., a time delay due to a slight change in range for an object caused by the object moving by distance v*t, where v is the velocity of the object and t is time).

To recover Doppler information (e.g., velocity information about each object), the second FFT 328—or "Doppler FFT"—is performed on the co-located bins (represents the corner turn or transpose operation) from all ramps. The Doppler information is conveyed in a stream of complex values transmitted on bus 327 and stored in memory 342. Each complex value represents the magnitude (amplitude) and phase of the digital radar signal 321 at a respective range and Doppler coordinate pair. Note that in preferred embodiments the stream of complex values on 327 is not simply a two-dimensional range-Doppler map but has a third dimension and may thus be thought of as a 3D radar cube 329 having Range axis, Doppler axis, and a receive antennae axis. Thus, the 3D radar cube 329 stored in memory 342 includes received powers from various objects in a field, and can be plotted according to L receive antennas (identified by index I), M range bins (identified by index m), and N Doppler bins (identified by index n). L, M, and L are each integers, and can have the same or different values from one another.

Some other approaches process the 3D radar data 329 in memory 342 solely by software, which is quite flexible and often low-power when processing cores are optimized. However, some aspects of the present disclosure appreciate that while software offers some advantages, additional processing speed can be gained by performing functions downstream of the second FFT 328 in hardware. To enable this hardware acceleration, a Direct Memory Access circuit (DMA) 346 is coupled to the memory via a bus 344. The DMA 346 is configured to access the 3D radar cube data 329 stored in memory 342 and write that data to one or more other downstream processing circuits 348 via bus 350. Note that busses 344 and 350 can be separate busses (e.g., 344 and 350) or a single bus (e.g., 344 and 344a with 350 omitted), depending on the implementation. Using separate busses 344/350 provides an advantage of increased processing speed for the DMA 346 because data can be retrieved continuously on 344 and written continuously on 350 without contention on busses 344/350. Using only a single bus 344/344a provides an advantage of less wiring, which equates to a smaller footprint and a less expensive die.

Compared to implementations where radar downstream of the memory 342 is performed entirely in software, the DMA 346 and downstream processing circuit 348 being disposed in hardware enables higher throughput than other software-based radar approaches. Thus, in some cases, all the blocks illustrated in the baseband processor 304 of FIG. 3 are included in a single integrated circuit. For instance, the DMA 346 and downstream processing circuit 348 can manifest as a circuit logic (e.g., transistors) arranged downstream of memory 342. The transistors can include metal oxide semiconductor field effect transistors (MOSFETs), bi-polar junction transistors (BJTs), and/or fin field effect transistors (finFETs), and can be disposed in a silicon substrate. Moreover, the transistors can be connected to one another by copper metal lines and vias in a dielectric structure over the silicon substrate to achieve the functionality described. In other cases the blocks illustrated in the baseband processor 304 are spread among multiple integrated circuits arranged on a printed circuit board, and/or are disposed on multiple silicon substrates that are stacked in a single package as a 3-dimensional integrated circuit.

The bus structure 344/344a can employ serial data transfer or parallel data transfer, and is implemented as a series of wires on an integrated circuit, typically in a metal inter-connect structure comprising metal (e.g., copper) lines stacked over one another and connected by metal (e.g., copper) vias which are disposed over a silicon substrate. For example, the bus structure 344/344a can typically include a read/write line, a group of address lines, and a group of data lines. In some cases, the data lines can include dedicated input data lines and dedicated output data lines that are separate/distinct from the input data lines, while in other cases the input and output lines can be bi-directional data lines used for transmission of both input data and output data. In alternative embodiments, a second bus interface 518 can also be included, and can connect to a second bus 350 to other circuits (e.g., integration circuit and/or target detection circuit). The second bus 350 can also include a read/write line, a group of address lines, and a group of data lines, and be electrically isolated from the first bus, such that the first and second busses, if present can concurrently carry different data and/or different addresses.

Regardless of the exact details of the hardware implementation, by including the DMA 346 and downstream processing circuit 348, such as an integration circuit and/or target detection circuit, in hardware; FIG. 3's system approach provides better radar processing speed than other software-based approaches.

Figure 4:
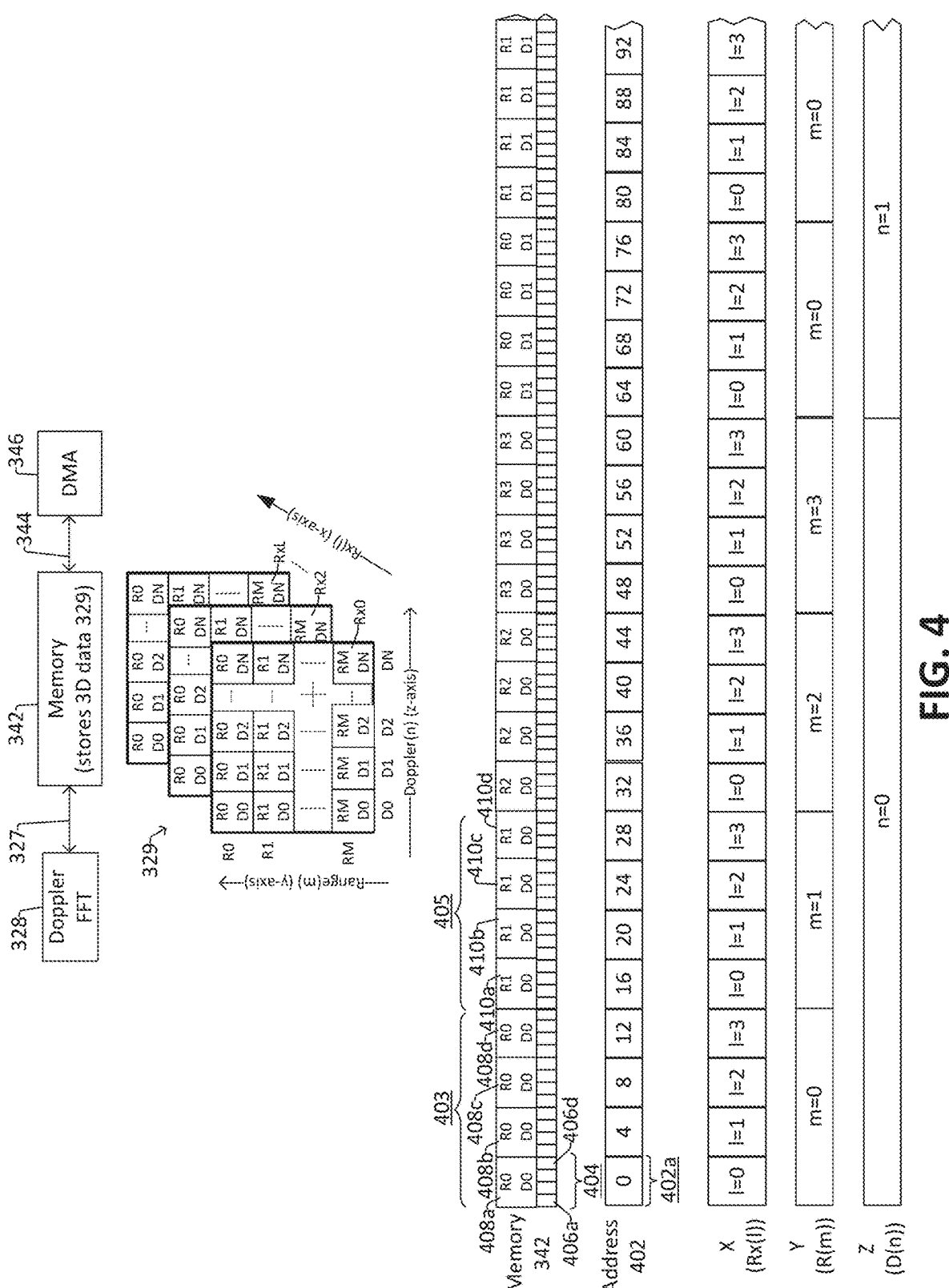
FIG. 4 illustrates a more detailed example of how 3D radar data can be written to physical memory from an FFT circuit in accordance with some aspects of the present disclosure.

FIG. 4 shows a more detailed example of how 3D radar data 329 can be written from the Doppler FFT circuit 328 to memory 342 over bus 327, and subsequently retrieved by the DMA 346 in an efficient manner. As shown, the memory 342 is organized according to addresses 402, wherein each address stores multiple units of data. For example, in FIG. 4, a first address (address 0) 402a stores a data word 404 that is made up of four units of data 406a-406d, wherein each unit of data can correspond to a byte, for example. The stream of complex values on bus 327 (and which make up the 3D radar data 329) can include any number of units of data, though FIG. 4 shows an example where the complex value for each Range/Doppler coordinate pair is four data units in length for purposes of clarity. Further, for clarity in this example, the number of receive antennae (L) equals 4 and the number of range bins (M) equals 4, but in general the number of receive antennae and number or range bins can take any values and be the same or different from one another.

As units of data corresponding to complex values arrive on bus 327, they are written into consecutive addresses of the memory 342. Because the data represents 3D radar data, some portions of the 3D radar cube 329 are stored in continuous regions of memory 342, but other portions are "scattered" in some regards over the memory 342. For example, in the illustrated example, for the first Range-Doppler coordinate pair of R0, D0, complex values for the four receive antennae are received first in time and make up a first vector 403. Thus, these complex values for R0,D0 over N=4 receive antennae (408a, 408b, 408c, 408d) are written to four corresponding addresses (0 . . . 12, respectively). Next, for the second Range-Doppler coordinate pair of R1, D0, complex values that make up a second vector 405 for the four receive antennae (410a, 410b, 410c, 410d) are written to the next sequential addresses (16 . . . 28, respectively); and so on.

Because the data sizes and storage ordering of the Range-Doppler coordinate pairs are known, the DMA 346 is configured to make use of an intelligent retrieval approach to easily retrieve desired data based on a receive antenna index (l), a range bin index (m), and a Doppler bin index (n) for the desired data. Thus, when the DMA 346 retrieves the data from memory 342, the DMA 346 is instructed what Range-Doppler coordinate pair is to be retrieved. The DMA can then calculate the appropriate address for that Range-Doppler coordinate pair by making use of the three indices (l, m, n) for the radar data. When the DMA 346 is instructed to read a value of a particular data element (e.g., Range-Doppler pair at a given receive antenna), the address of that data element can be determined by the following calculation:

$$\text{Address} = \{\text{Start Address of Array}\} + l * ML + m * \{L * ML\}\} +$$
$$n * \{M * \{L * ML\}\}$$

where L is the number of receive antennae on the "x" axis (e.g., L represents 4 receive antennae in FIG. 4), M is the number of Range bins on the y axis (e.g., M represents 4 Range bins in FIG. 4), and N is the number of Doppler bins on the z axis (e.g., although not shown in FIG. 4 we presume N is 8 for purposes of an example). As an example, consider a case where the complex value for each Range-Doppler coordinate pair spans exactly 4 memory locations (e.g., 404), and the DMA is instructed to read the first receive antenna (l=0) for a Range-Doppler pair (R3,D0), such that the range-Doppler pair to be read has indices (l=0, m=3, n=0). In such a case, assuming the Start Address of the Array is 0, the Address for this Range-Doppler pair will be:

$$\text{Address} = \{0\} + l * 4 + m * \{4 * 4\} + n * \{4 * \{4 * 4\}\}$$
$$= 0 + 0 * 4 + 3 * (16) + 0 * (64)$$
$$= 48$$

Similarly, the second receive antenna (l=1) for a Range-Doppler pair (R1,D1) has indices of (l=1,m=1,n=1), the Address for this Range-Doppler pair will be:

$$\text{Address} = \{0\} + l * 4 + m * \{4 * 4\} + n * \{4 * \{4 * 4\}\}$$
$$= 0 + 1 * 4 + 1 * (16) + 1 * (64)$$
$$= 84$$

Thus, the DMA 346 can efficiently retrieve data from addresses in physical memory based on indices of the Range-Doppler pairs. It will be appreciated that the x, y, and z axes illustrated are merely an example, and can be interchanged with one another in a myriad of ways, depending on the implementation.

It will be appreciated that although FIG. 4 provides an example in a radar application with 3D radar data, that the present DMA techniques are applicable to any type of other system that employs 3D data. Thus, while this example is couched in terms of complex values for Range-Doppler pairs, more generally the concept is applicable to any data element. Similarly the x-axis, y-axis, and z-axis have been illustrated and described with regard to receive antennae, Range bins, and Doppler bins, but other variables can be substituted in place of these in other applications without departing from what is contemplated by the present disclosure.

Figure 5:
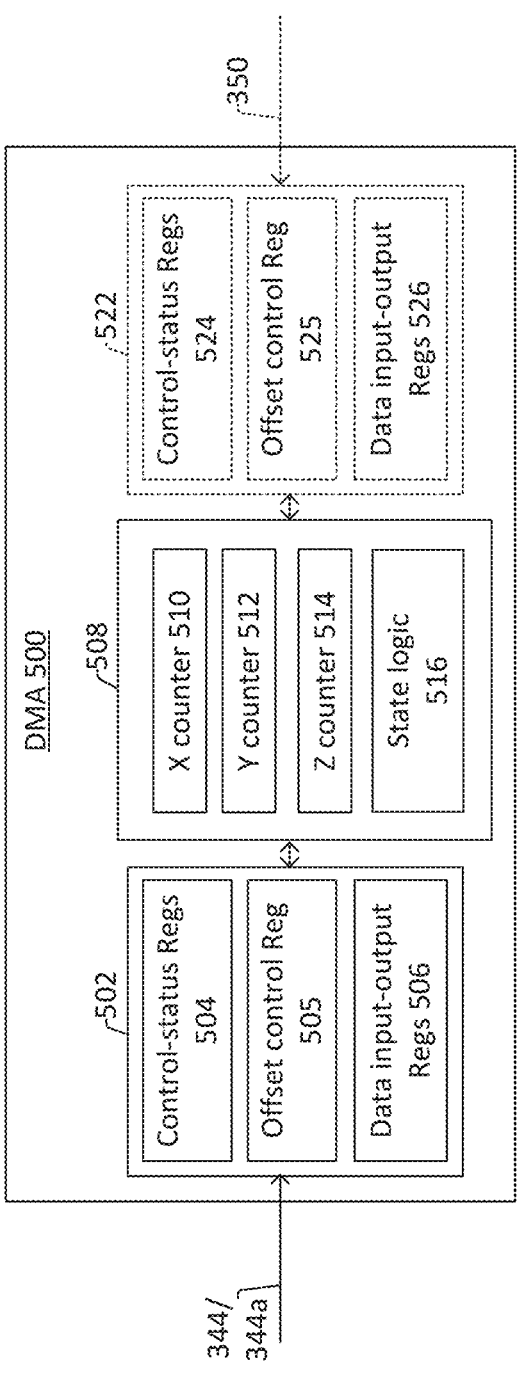
FIG. 5 illustrates a more detailed block diagram of a DMA in accordance with some embodiments.

FIG. 5 shows a more detailed block diagram of a DMA 500 in accordance with some aspects of the disclosure, and which can be consistent with some examples of DMA 346. The DMA 500 includes a memory bus interface 502 (e.g., which connects to bus structure 344/344a of FIG. 3), including a set of control/status registers 504, an offset control register 505, and data input/output registers 506. The memory bus interface 502 is coupled to DMA logic 508, which includes an X counter 510, a Y counter 512, a Z counter 514, and state logic 516. The X counter 510, Y counter 512, and Z counter 514 aid in calculating the address of a particular data element (e.g., Range/Doppler coordinate pair) based on a receive antenna index (l), a range index (m), and a Doppler index (n) of that data element. Further, the offset control register 505 allows the DMA to determine an address offset from a particular data element, thereby allowing the DMA to provide higher level functionality such as Doppler Division Multiplex (DDM) functionality making use of offsets, for example as described further herein in FIG. 5. The offset control register 505 can also store multiple, different offsets in some instances, thereby allowing the use of different offsets by the DMA.

Figure 6A:
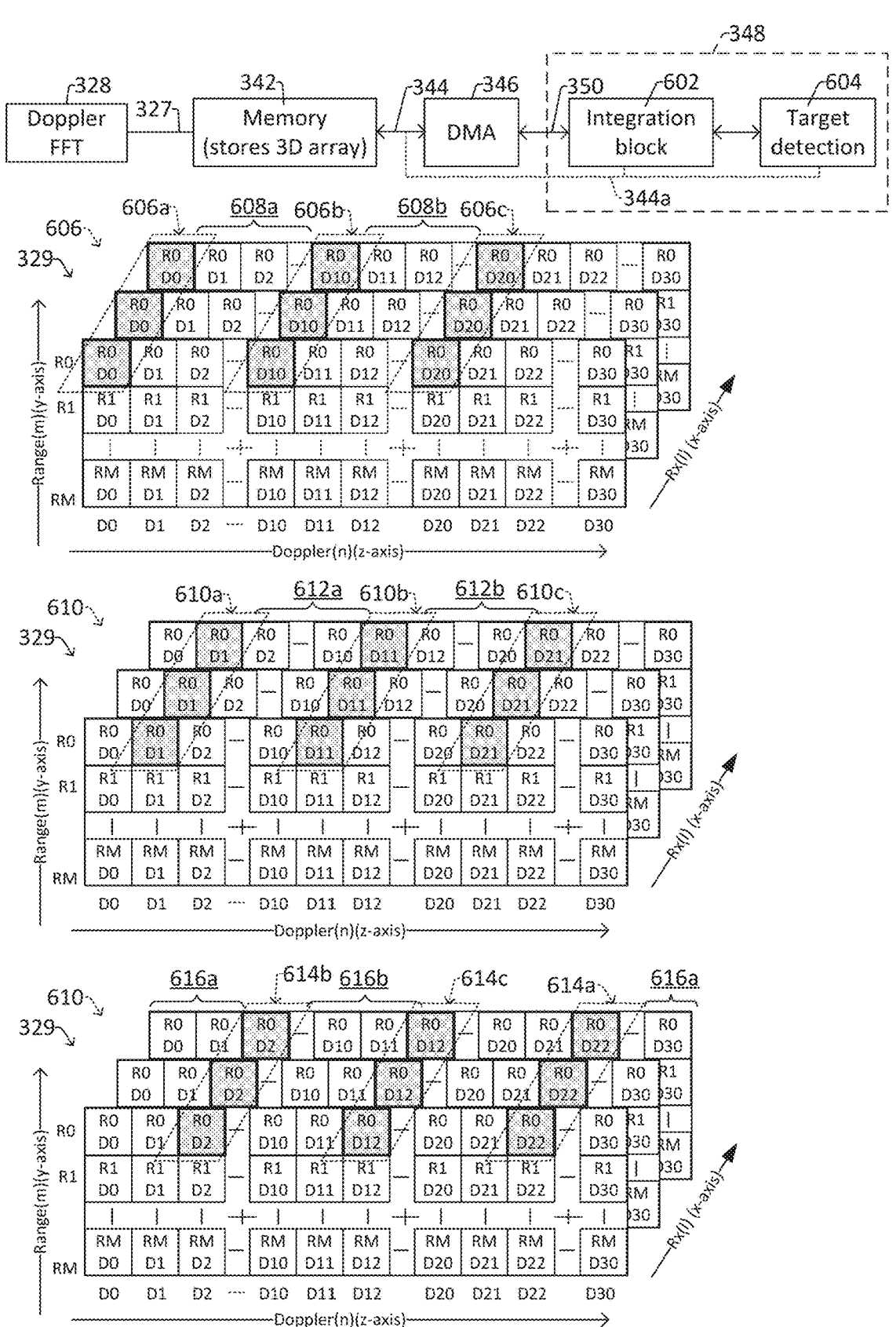
FIGS. 6A-6B illustrate a series of drawings that depict a use case of a DMA that reads 3D radar data using offsets and feeds the results of the read data to an integration circuit and/or target detection circuit.
Figure 6B:
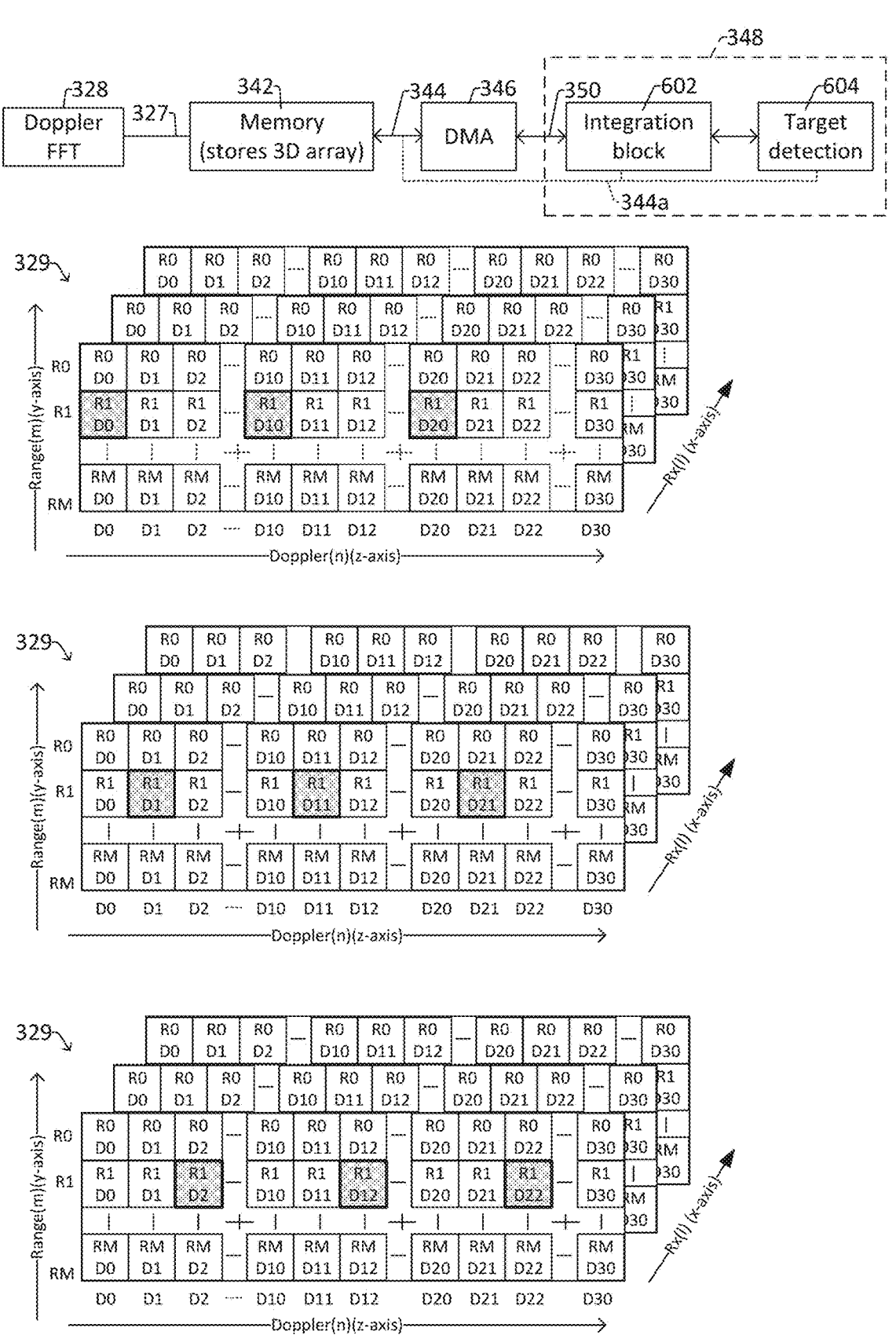

FIGS. 6A-6B illustrate a series of drawings that depict a particular use case example of how a DMA (e.g., DMA 346 and/or DMA 500) can be implemented in hardware to make use of an auxiliary loop to improve radar performance. In this example, the 3D radar data includes N=30 Doppler bins. The DMA 346 can read 3D radar data 329 in a "loop" using offsets, and can then feed the results of the data read to an integration circuit 602 and target detection circuit 604 that process the 3D radar data to detect potential targets at various range bins (distances) and Doppler bins (velocities). Each signal received from a physical receive antenna 312 (FIG. 3) includes signals generated from each transmit antenna 310. Each signal is distinguished because the transmitted signals from each transmitter are transmitted with a different phase modulation. The different phase modulations result in the signal returns associated with each transmitter having a different offset on the Doppler axis in the Doppler FFT results. This makes it possible to demodulate a plurality of virtual receive channels from the received signals from the receive antenna 312 by reading the Doppler FFT results multiple times with a different starting offset. This capability is provided by the auxiliary loop. In general, the total number of virtual receive channels equals JTx*NRx (see 310 and 312 of FIG. 3).

In the upper portion of FIG. 6A, the DMA 346 receives a first read request and reads a first subset 606 of Range-Doppler coordinate pairs stored in memory 342 in response to that read request. In the illustrated example, the first subset 606 Range-Doppler coordinate pairs includes a first Range-Doppler vector 606a, a second Range-Doppler vector 606b, and a third Range-Doppler vector 606b. The first Range-Doppler vector has a base address that can correspond to a first Range-Doppler coordinate pair (e.g., R0, D0 having index m=0, n=0) and can be known to the DMA at boot-up or provided to the DMA during operation. When the DMA 346 has the base address of the first Range-Doppler vector 606a, the DMA can increment the Doppler bin by a first Doppler offset (e.g., here having a value of 10 as written to offset control register 505) to identify a second Range index (m=10) of the second Range-Doppler vector 606b. The DMA 346 can also increment the Doppler bin by a second Doppler offset 608b to identify a third Range index (m=20) of the third Range-Doppler vector 606c. Then, DMA can translate the Doppler and range indices (m=0, n=10) of the second Range-Doppler vector 606b to a second address and can translate indices (m=0, n=20) of the third Range-Doppler vector 606c to a third address, such as previously described in FIG. 4. The second Doppler offset 608b can be specified relative to the first Doppler bin or relative to the second Doppler bin.

After being retrieved by the DMA, the complex values of the first subset 606 of Range-Doppler coordinate pairs are provided from the DMA 346 to the integration circuit 602. The integration circuit 602 sums the complex values of the first subset 606 of Range-Doppler coordinate pairs to provide a first resultant power intensity for the first Range-Doppler coordinate pair (e.g., R0, D0). This integration can include a weighted average over all virtual antennae (e.g., over LRx*JTx elements). The target detection circuit 604 then performs processing to determine whether the first resultant power intensity represents no target, an actual target, or a phantom target for the first Range/Doppler coordinate pair (e.g., R0, D0). For example, the target detection circuit 604 can compare the first resultant power intensity to a power threshold to make this determination.

In the middle portion of FIG. 6A, the virtual receive channel is incremented and the next Doppler bin is evaluated. More particularly, the DMA receives a second read request and read data from a second subset 610 of Range-Doppler coordinate pairs stored in memory 342. The second subset 610 of Range-Doppler coordinate pairs includes a fourth Range-Doppler vector 610a, a fifth Range-Doppler vector 610b, and a sixth Range-Doppler vector 610c. The fourth Range-Doppler vector 610a is spaced apart from the fifth Range-Doppler vector 610b by a third Doppler offset 612a, and the fifth Range-Doppler vector 610b is spaced apart from the sixth Range-Doppler vector 610c by a fourth Doppler offset 612b. The third and fourth Doppler offsets 612a, 612b are often equal to the first and second Doppler offsets 608a, 608b, respectively. The integration circuit 602 sums the complex values corresponding to the second subset 610 to provide a second resultant power intensity, which corresponds to a second Range-Doppler pair (e.g., R0, D1) of the second subset 610. The target detection circuit 604 then performs processing to determine whether the second resultant power intensity represents no target, an actual target, or a phantom target for the second Range/Doppler coordinate pair (e.g., R0, D1). For example, the target detection circuit 604 can compare the second resultant power intensity to the power threshold to make this determination.

Integration continues in this way to determine a power intensity for each Doppler element of Range 0, and the target detection circuit then determines whether respective potential targets are present in the first range value and respective Doppler values based on the whether the respective resultant power intensities are greater than the predetermined threshold.

Further, as shown in the lower portion of FIG. 6A, assuming an example where there are 30 Doppler bins, when the power intensity for the higher Doppler elements are determined, the Doppler offsets may "wrap around" the Doppler bins in modulo fashion. In the illustrated example, a power intensity for the Doppler22, Range 0 element is determined by summing the power intensities for Doppler 22 (first transmitter (VTx1)), Doppler 2 (VTx2) and Doppler 12 (VTx3) over the NRx antennae, thereby providing a single power intensity for the Doppler22, Range 0 element.

When a power intensity for each of the Range/Doppler bins for Range 0 is determined (e.g., as shown in FIG. 6A), integration proceeds to the next range bin as shown in FIG. 6B. In FIG. 6B the DMA 346 reads vectors which share a second range value (e.g., R1, which differs from the first range value R0), but otherwise FIG. 6B is similar to FIG.

6A. Once all Range/Doppler bins have been evaluated, the DMA can "loop back" to the first range bin of FIG. 6A, and thus the DMA can continually refresh/update the radar data so targets on detected/updated in on-going fashion.

Although FIGS. 6A-6B illustrate an example where a subset of three vectors (and hence three virtual receive channels for each physical receive channel) are read to determine a power intensity for each Range/Doppler coordinate pair, any other number of vectors can alternatively be included in each subset. Further, in the example of FIGS. 6A-6B, the three vectors are equally spaced from one another (e.g., by 10 Doppler bins); however in other embodiments, the vectors can be spaced apart by different amounts (e.g., first Doppler offset 608a can be a first value (e.g., 10 bins) and the second Doppler offset 608b can be a second, different value (e.g., 12 bins or 3 bins). In some embodiments, the number of virtual receive channels can be programmable, which can be set by writing the desired offset to the offset register 505 of the DMA.

In some cases, the integration may comply with the following pseudo-code, wherein the DMA 346 and integration circuit 602 provide this functionality in hardware:

```
sum_{Range,Doppler} = 0
offsets[3] = {0, 10, 20}
JTx = 3; NRx = 4
Loop T = 1 to JTx
    Loop R = 1 to NRx
        sum_{Range,Doppler} = Sum (Read Antenna[R]
        value at Doppler[offsets[T]])
    End Loop R
End Loop T
Store sum_{Range,Doppler}
```

FIG. 7 depicts a method 700 in accordance with some aspects of this disclosure.

In block 702, digital radar data is received. In some aspects, block 702 can correspond to digital radar data received from ADC 320 in FIG. 3.

In block 704, a fast Fourier transform (FFT) is performed on the radar data to provide a stream of complex values. The stream of complex values corresponds to a plurality of receive antennae and a plurality of Range-Doppler coordinate pairs.

In block 706, the stream of complex values are stored in memory.

In block 708, a DMA is used to retrieve a first subset of the complex values from the memory. The first subset of the complex values correspond to a first multiplicity of Range-Doppler coordinate pairs from the memory. In some cases, the first multiplicity of Range-Doppler coordinate pairs in the first subset share a first Range index with one another and have different Doppler indices from one another.

In block 710, the DMA is used to retrieve a second subset of the complex values from the memory. The second subset of the complex values correspond to a second multiplicity of Range-Doppler coordinate pairs from the memory. In some cases, the first and second subset each share a first range index, and Doppler indices of the first subset differ from Doppler indices of the second subset.

In block 712, the complex values of the first subset are summed to determine a resultant power intensity.

In block 714, the method determines whether a potential target is present for a Range-Doppler coordinate pair which corresponds to the first subset. The determination is based on whether the resultant power intensity is greater than a predetermined threshold.

It will be appreciated that in this written description, as well as in the claims below, the terms "first", "second", "second", "third" etc. are merely generic identifiers used for ease of description to distinguish between different elements of a figure or a series of figures. In and of themselves, these terms do not imply any temporal ordering or structural proximity for these elements, and are not intended to be descriptive of corresponding elements in different illustrated embodiments and/or un-illustrated embodiments. For example, "a first" element described in connection with a first figure or claim may not necessarily correspond to a "first" element described in connection with another figure or claim, may not necessarily correspond to a "first" element in an un-illustrated embodiment; and may instead be referred to as a "second" element, "third" element, etc., in another embodiment in various figures or claims.

Thus, some examples relate to a radar system. The radar system includes a radio frequency (RF) receiver configured to receive radar data at a plurality of receive antennae. A fast Fourier transform (FFT) circuit is coupled to the RF receiver. The FFT circuit is configured to perform a FFT on the radar data to provide a stream of complex values. The stream of complex values includes a plurality of Range-Doppler coordinate pairs that pertain to the plurality of receive antennae. A memory is coupled to the FFT circuit. The memory is configured to store three-dimensional (3D) radar data. A Direct Memory Access circuit (DMA) is coupled to the memory.

In some further examples of a radar system, the DMA is configured to receive a first read request for a first Range-Doppler coordinate pair stored in the memory. The DMA is further configured to read a first subset of range/Doppler coordinate pairs from the memory in response to the first read request. The first subset includes a first vector and a second vector that are spaced apart from one another according to a first offset.

In some further examples of a radar system, the first offset is programmable, and the DMA comprises a register to which the first offset can be programmed.

In some further examples of a radar system, the first subset further includes a third vector that is spaced apart from the second vector by a second offset, and the first, second, and third vectors share a single range value.

In some further examples of a radar system, the second offset is equal to the first offset.

In some further examples of a radar system, the DMA is configured to receive a second read request for a second Range-Doppler coordinate pair stored in the memory. The DMA is further configured to read a second subset of range/Doppler coordinate pairs from the memory in response to the second read request. The second subset includes a fourth vector and a fifth vector that are spaced apart from one another according to the first offset. The fourth vector is arranged between the first vector and the second vector.

In some further examples of a radar system, the DMA is configured to receive a third read request for a third Range-Doppler coordinate pair stored in the memory. The DMA is further configured to read a third subset of range/Doppler coordinate pairs from the memory in response to the third read request. The third subset includes a sixth vector and a seventh vector that are spaced apart from one another according to the first offset. The first vector and the second vector share a first range value, and the sixth vector and the seventh vector share a second range value that differs from the first range value.

In some further examples of a radar system, the complex values are stored in memory according to a predetermined pattern, and the DMA is configured to retrieve a complex value corresponding to a Range-Doppler coordinate pair based on a range index and a Doppler index corresponding to the Range-Doppler coordinate pair.

Some examples relate to a baseband processor for radar. The baseband processor includes a fast Fourier transform (FFT) circuit having an input and an output; a memory having an input coupled to an output of the FFT circuit; and a Direct Memory Access circuit (DMA) coupled to the memory. The FFT circuit, the memory, and the DMA are disposed on a single silicon substrate.

Some further examples of a baseband processor further include: a first bus coupling the output of the FFT circuit to the memory; and a second bus which is distinct from the first bus coupling the memory to the DMA.

In some further examples of a baseband processor, the first bus includes a first set of interconnect wires disposed in a dielectric structure over the single silicon substrate, and the second bus includes a second set of interconnect wires disposed over the single silicon substrate.

In some further examples of a baseband processor, the FFT circuit is configured to write a stream of complex values corresponding to respective Range-Doppler coordinate pairs to the memory according to a predetermined pattern. The DMA is configured to retrieve a first complex value corresponding to a first Range-Doppler coordinate pair from the memory based on both a first range index and a first Doppler index that correspond to the first Range-Doppler coordinate pair.

In some further examples of a baseband processor, the DMA is configured to receive a first read request for the first Range-Doppler coordinate pair. The DMA is further configured to read a first subset of range/Doppler coordinate pairs from the memory in response to the first read request. The first subset includes a first vector and a second vector that are spaced apart from one another according to a first offset.

In some further examples of a baseband processor, the baseband processor further includes an integration circuit coupled to the DMA. The integration circuit is configured to receive the first vector and second vector from the DMA, and determine a first power intensity for the first Range-Doppler coordinate pair by summing the first vector and the second vector.

In some further examples of a baseband processor, the DMA is configured to receive a second read request for a second Range-Doppler coordinate pair in the memory. The DMA is further configured to read a second subset of range/Doppler coordinate pairs from the memory in response to the second read request. The second subset includes a third vector and a fourth vector that are spaced apart from one another according to the first offset.

In some further examples of a baseband processor, the baseband processor includes an integration circuit coupled to the DMA. The integration circuit is configured to receive the first vector and the second vector from the DMA, and determine a first power intensity for the first Range-Doppler coordinate pair by summing the first vector and the second vector. The integration circuit is configured to receive the third vector and the fourth vector from the DMA, and determine a second power intensity for the second Range-Doppler coordinate pair by summing the third vector and the fourth vector.

Some further examples relate to a method for radar processing. Radar data is received, and a fast Fourier transform (FFT) is performed on the radar data to provide a stream of complex values. The stream of complex values corresponds to a plurality of receive antennae and a plurality of Range-Doppler coordinate pairs. The stream of complex values is stored in memory. A DMA is used to retrieve a first subset of the complex values corresponding to a first multiplicity of Range-Doppler coordinate pairs from the memory.

In some examples of the method, the first multiplicity of Range-Doppler coordinate pairs in the first subset share a first Range index and have different Doppler indices from one another.

In some examples of the method, the DMA is used to retrieve a second subset of the complex values corresponding to a second multiplicity of Range-Doppler coordinate pairs from the memory. The first and second subset each share a first range index and Doppler indices of the first subset differ from Doppler indices of the second subset.

In some examples of the method, the complex values of the first subset are summed to determine a resultant power intensity; and the method determines whether a potential target is present for a Range-Doppler coordinate pair corresponding to the first subset based on whether the resultant power intensity is greater than a predetermined threshold.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising".

What is claimed is:

1. A radar system:
   a radio frequency (RF) receiver configured to receive radar data at a plurality of receive antennae;
   a fast Fourier transform (FFT) circuit coupled to the RF receiver, the FFT circuit configured to perform an FFT on the radar data to provide a stream of complex values, the stream of complex values including a plurality of Range-Doppler coordinate pairs that pertain to the plurality of receive antennae;

a memory coupled to the FFT circuit, the memory configured to store three-dimensional (3D) radar data; and a Direct Memory Access circuit (DMA) coupled to the memory, the DMA comprising an offset control register configured to store one or more Doppler offset values, the DMA configured to, in response to a read request for a subset of Range-Doppler coordinate pairs sharing a Range coordinate, read the Range-Doppler coordinate pairs in the subset multiple times in a loop manner with different starting offsets based on the stored one or more Doppler offset values, with each read corresponding to a different virtual receive antenna.

2. The radar system of claim 1, wherein the DMA is configured to receive a first read request for a first Range-Doppler coordinate pair stored in the memory, and wherein the DMA is further configured to read a first subset of Range-Doppler coordinate pairs from the memory in response to the first read request, the first subset including a first vector and a second vector that are spaced apart from one another according to a first Doppler offset value stored in the offset control register.

3. The radar system of claim 2, wherein the first subset further includes a third vector that is spaced apart from the second vector by a second Doppler offset value stored in the offset control register, and the first, second, and third vectors share a single range value.

4. The radar system of claim 3, wherein the second Doppler offset value is equal to the first Doppler offset value.

5. The radar system of claim 2, wherein the DMA is configured to receive a second read request for a second Range-Doppler coordinate pair stored in the memory, and wherein the DMA is further configured to read a second subset of Range-Doppler coordinate pairs from the memory in response to the second read request, the second subset including a fourth vector and a fifth vector that are spaced apart from one another according to the first Doppler offset value, wherein the fourth vector is arranged between the first vector and the second vector.

6. The radar system of claim 2, wherein the DMA is configured to receive a third read request for a third Range-Doppler coordinate pair stored in the memory, and wherein the DMA is further configured to read a third subset of Range-Doppler coordinate pairs from the memory in response to the third read request, the third subset including a sixth vector and a seventh vector that are spaced apart from one another according to the first Doppler offset value, wherein the first vector and the second vector share a first range value, and the sixth vector and the seventh vector share a second range value that differs from the first range value.

7. The radar system of claim 1, wherein the offset control register is programmable.

8. The radar system of claim 1, wherein a number of virtual receive antennas is controlled based on the Doppler offsets stored in the offset control register.

9. A baseband processor for radar, comprising a fast Fourier transform (FFT) circuit having an input and an output;

a memory having an input coupled to the output of the FFT circuit; and a Direct Memory Access circuit (DMA) coupled to the memory, the DMA comprising an offset control register configured to store one or more Doppler offset values, the DMA configured to, in response to a read request for a subset of Range-Doppler coordinate pairs sharing a Range coordinate, read the Range-Doppler coordinate pairs in the subset multiple times in a loop manner with different starting offsets based on the stored one or more Doppler offset values, with each read corresponding to a different virtual receive antenna;

wherein the FFT circuit, the memory, and the DMA are disposed on a single silicon substrate.

10. The baseband processor of claim 9, wherein the DMA is configured to receive a first read request, and wherein the DMA is further configured to read a first subset of Range-Doppler coordinate pairs from the memory in response to the first read request, the first subset including a first vector and a second vector that are spaced apart from one another according to a first Doppler offset value stored in the offset control register.

11. The baseband processor of claim 10, wherein the DMA is configured to receive a second read request for a second Range-Doppler coordinate pair in the memory, and wherein the DMA is further configured to read a second subset of Range-Doppler coordinate pairs from the memory in response to the second read request, the second subset including a third vector and a fourth vector that are spaced apart from one another according to the first offset.

12. The baseband processor of claim 9, wherein the integration circuit is configured to determine a power intensity for the subset of Range-Doppler coordinate pairs based on values stored in the subset of Range-Doppler coordinate pairs.

13. The baseband processor of claim 9, wherein a number of virtual receive antennas is controlled based on the Doppler offsets stored in the offset control register.

* * * * *